United States Patent
Lu et al.

(10) Patent No.: US 8,217,634 B2
(45) Date of Patent: Jul. 10, 2012

(54) CURRENT CONTROL SYSTEMS WITH CURRENT FEEDBACKS

(75) Inventors: Chun Lu, San Jose, CA (US); Luyang Luo, Chengdu (CN); Feng Shi, Chengdu (CN); Xinhe Su, Chengdu (CN)

(73) Assignee: O2Micro, Inc., Santa Clara, CA (US)

( * ) Notice: Subject to any disclaimer, the term of this patent is extended or adjusted under 35 U.S.C. 154(b) by 449 days.

(21) Appl. No.: 12/487,355

(22) Filed: Jun. 18, 2009

(65) Prior Publication Data

US 2010/0320979 A1  Dec. 23, 2010

(51) Int. Cl.
*G05F 1/40* (2006.01)

(52) U.S. Cl. .................................... 323/271

(58) Field of Classification Search .......... 323/222, 323/223, 225, 268, 271, 272, 282, 285
See application file for complete search history.

(56) References Cited

U.S. PATENT DOCUMENTS

| 5,654,652 A | * | 8/1997 | Raza et al. ............... 327/17 |
| 6,407,532 B1 | | 6/2002 | Ruha |
| 6,914,452 B2 | * | 7/2005 | Gauthier et al. ......... 326/98 |
| 2007/0229050 A1 | | 10/2007 | Shigeta et al. |

FOREIGN PATENT DOCUMENTS

| CN | 1361572 A | 7/2002 |
| TW | 200532218 A | 10/2005 |

OTHER PUBLICATIONS

English translation of Chinese Office Action dated Jun. 20, 2011, issued in related patent application No. CN201010173856.0.

* cited by examiner

*Primary Examiner* — Matthew Nguyen

(57) ABSTRACT

A current control system includes a first switch, a second switch, and a controller. The second switch is coupled in parallel with the first switch and operable for providing a feedback signal indicative of a current flowing through the first switch. The feedback signal is determined by a width-to-length ratio of the first switch and a width-to-length ratio of the second switch. In addition, the controller is coupled to the first and second switches and operable for adjusting the current according to the feedback signal.

21 Claims, 6 Drawing Sheets

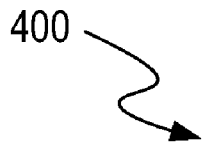

```
┌─────────────────────────────────────┐
│  DELIVERING A FIRST CURRENT BY A FIRST │
│              SWITCH                  │
│               402                    │
└─────────────────────────────────────┘
                  │
                  ▼
┌─────────────────────────────────────┐
│ PROVIDING A FEEDBACK SIGNAL INDICATIVE OF │
│  THE FIRST CURRENT BY A SECOND SWITCH │
│  COUPLED IN PARALLEL WITH THE FIRST SWITCH │
│               404                    │
└─────────────────────────────────────┘
                  │
                  ▼
┌─────────────────────────────────────┐
│ ADJUSTING THE FIRST CURRENT ACCORDING TO │
│        THE FEEDBACK SIGNAL           │
│               406                    │
└─────────────────────────────────────┘
```

FIG. 4

CURRENT CONTROL SYSTEMS WITH CURRENT FEEDBACKS

BACKGROUND

FIG. 1 illustrates a conventional current control system 100. As shown in FIG. 1, a DC/DC (direct current to direct current) converter 102 converts input power 122 to a charging current $I_{110}$ for charging a battery pack 120. A current sensor 104 senses the charging current $I_{110}$ and generates a sense voltage $V_{118}$ that is proportional to the charging current $I_{110}$.

More specifically, the current sensor 104 includes a sense resistor 110 coupled between the DC/DC converter 102 and the battery pack 120. The charging current $I_{110}$ flows through the sense resistor 110, such that a voltage $V_{110}$ on the resistor 110 can be given by $V_{110}=I_{110}*R_{110}$, where $R_{110}$ represents resistance of the resistor 110. An operational amplifier 112 in the current sensor 104 has a first input terminal 124 coupled to a terminal of the resistor 110, and a second input terminal 126 coupled to another terminal of the resistor 110 via a resistor 114. Since voltage levels at the first and second input terminals 124 and 126 are substantially the same, a voltage $V_{114}$ on the resistor 114 can be substantially equal to the voltage $V_{110}$ on the resistor 110, e.g., $V_{114}=V_{110}=I_{110}*R_{110}$. Furthermore, an output signal 128 of the operational amplifier 112 can turn on a switch 116 that is coupled to the second input terminal 126 and ground via a resistor 118. As such, a current $I_{114}$ can flow through the resistors 114 and 118, and can be given by $I_{114}=V_{114}/R_{114}=I_{110}*R_{110}/R_{114}$, where $R_{114}$ represents resistance of the resistor 114. The sense voltage $V_{118}$ on the resistor 118 therefore can be given by $V_{118}=I_{114}*R_{118}=I_{110}*R_{118}*R_{110}/R_{114}$, where $R_{118}$ represents resistance of the resistor 118.

As a result, the sense voltage $V_{118}$ is proportional to the charging current $I_{110}$. The DC/DC converter 102 can receive the sense voltage $V_{118}$ and adjust the charging current $I_{110}$ to a desirable current level according to the sense voltage $V_{118}$. However, usually the sense resistor 110 is relatively expensive. In addition, the operational amplifier 112 may cause relatively high power consumption.

BRIEF DESCRIPTION OF THE DRAWINGS

The accompanying drawings, which are incorporated in and form a part of this specification, illustrate embodiment of the present invention and, together with the description, serve to explain the principles of the invention:

FIG. 4 illustrates a flowchart example of operations performed by a current control system, in accordance with one embodiment of the present invention.

SUMMARY

In one embodiment, a current control system includes a first switch, a second switch, and a controller. The second switch is coupled in parallel with the first switch and operable for providing a feedback signal indicative of a current flowing through the first switch. The feedback signal is determined by a width-to-length ratio of the first switch and a width-to-length ratio of the second switch. In addition, the controller is coupled to the first and second switches and operable for adjusting the current according to the feedback signal.

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

In one embodiment, a current control system, e.g., a direct current to direct current (DC/DC) converter, is provided. The current control system can control a high-side switch and a low-side switch coupled in series to the high-side switch. An inductor coupled to the coupled high-side and low-side switches can deliver a current, e.g., a charging current to a battery pack, or a supply current to a load. A current sensor, e.g., a current mirror, provides a feedback signal indicative of the charging/supply current by sensing a current flowing through the high-side switch or the low-side switch. As such, by alternately turning on the high-side and low-side switches according to the feedback signal, the current control system can adjust the charging/supply current to a desirable level.

Figure 2A:
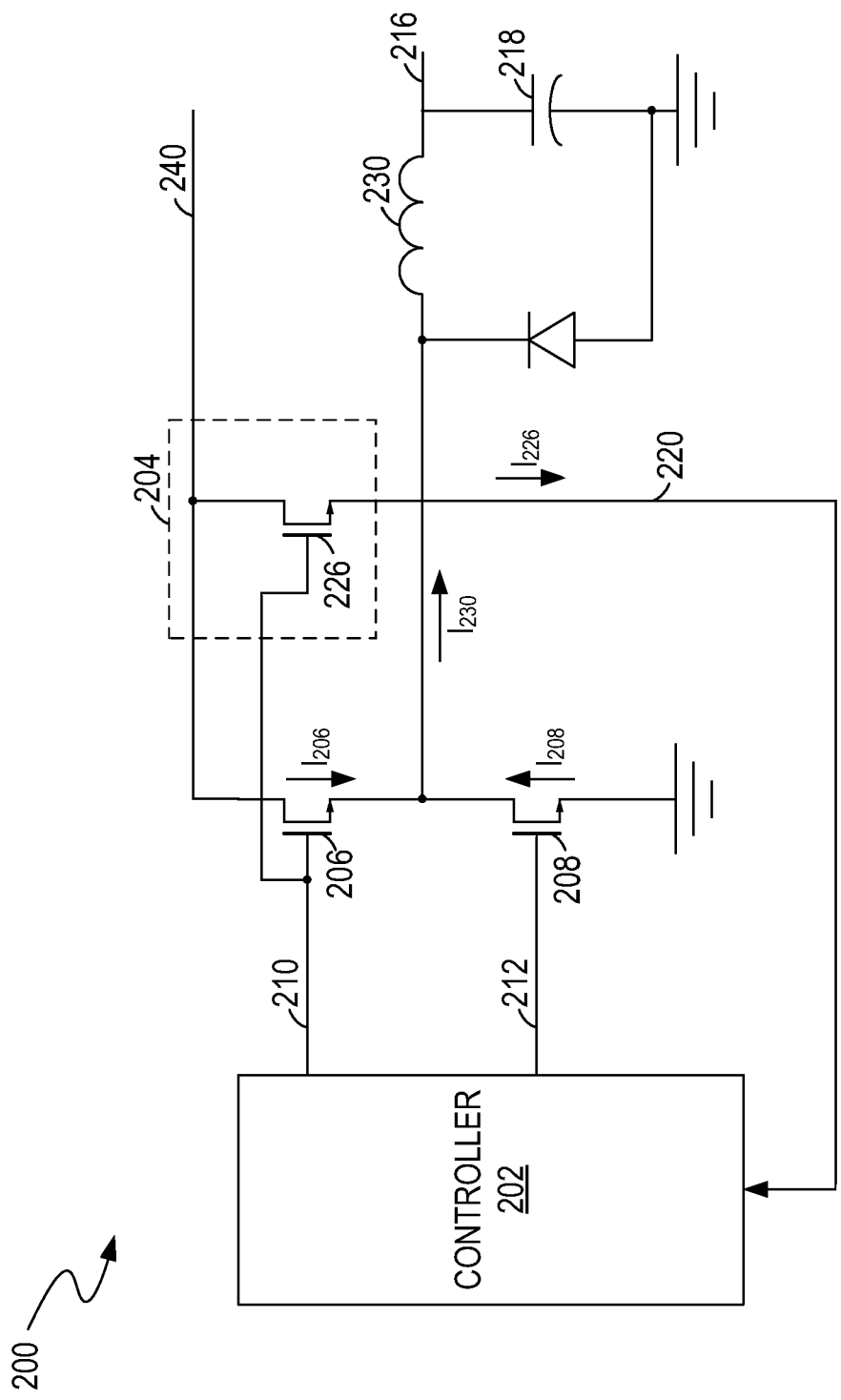
FIG. 2A illustrates a block diagram example of a current control system, in accordance with one embodiment of the present invention.

FIG. 2A illustrates a block diagram example of a current control system 200, in accordance with one embodiment of the present invention. In one embodiment of the current control system 200, a controller 202 can control a first switch, e.g., a high-side switch 206, according to a feedback signal 220 provided by a current sensor 204, so as to adjust a first current $I_{206}$ flowing through the first switch 206. The current sensor 204 can include a second switch 226 coupled in parallel with the first switch 206 and for providing the feedback signal 220. The feedback signal 220 indicates the first current $I_{206}$.

More specifically, the first switch 206 can be, but is not limited to, a MOSFET (metal oxide semiconductor field effect transistor). The MOSFET 206 has a gate voltage $V_{G206}$, a source voltage $V_{S206}$, and a drain voltage $V_{D206}$. As such, the first current $I_{206}$ can be determined by the gate voltage $V_{G206}$, the source voltage $V_{S206}$, and the drain voltage $V_{D206}$. Moreover, the second switch 226 can be, but is not limited to, a MOSFET. The MOSFET 226 has a gate voltage $V_{G226}$, a source voltage $V_{S226}$, and a drain voltage $V_{D226}$. The feedback signal 220 can be a second current $I_{226}$ flowing through the second switch 226. The second current $I_{226}$ can be determined by the gate voltage $V_{G226}$, the source voltage $V_{S226}$, and the drain voltage $V_{D226}$. In one embodiment, the second current $I_{226}$ is proportional to the first current $I_{206}$, such that the controller 202 coupled to the first and second switches 206 and 226 controls the first current $I_{206}$ according to the second current $I_{226}$.

As shown in FIG. 2A, gate terminals of the first switch 206 and the second switch 226 can be coupled to the same terminal, e.g., a terminal that is driven by the controller 202. Drain terminals of the switches 206 and 226 can be coupled to the same terminal, e.g., a power supply terminal 240. In addition, a voltage level at a source terminal of the first switch 206 and a voltage level at a source terminal of the second switch 226 can be adjusted to be substantially the same. In other words, the first switch 206 and the second switch 226 can have substantially the same gate voltage, drain voltage, and source voltage. As used herein, "substantially the same" means that a difference between a first voltage (e.g., the source voltage of the first switch 206) and a second voltage (e.g., the source voltage of the second switch 226) is permissible so long as the difference is relatively small and can be omitted.

As such, the feedback signal 220, e.g., the second current $I_{226}$, can be determined by a width-to-length ratio W/L of the switch (MOSFET) 206 and a width-to-length ratio $W_1/L_1$ of the switch (MOSFET) 226.

In one embodiment, the controller 202 includes an OTA (operational transconductance amplifier) 246 coupled to the third switch 226_2. The OTA 246 can receive a predetermined level $V_{REF1}$ and the voltage level $V_{250}$, and generate an output current 244 according to a difference between the predetermined level $V_{REF1}$ and the voltage level $V_{250}$.

In one embodiment, the current control system 200 further includes a driven switch, e.g., a low-side switch 208, coupled in series to the first switch 206. The controller 202 can control the first current $I_{206}$ by alternately turning on the first switch 206 and the driven switch 208 according to the feedback signal 220. For example, the controller 202 includes a pulse signal generator (not shown in FIG. 2A) for generating pulse width modulation (PWM) signals 210 and 212 to respectively control the switches 206 and 208. The pulse signal generator also adjusts a duty cycle of the PWM signals 210 and 212 according to the feedback signal 220.

In addition, the switches 206 and 208 are coupled to an inductor 230 that is coupled to ground via a capacitor 218. A current $I_{230}$ flowing through the inductor 230 can be adjusted by turning on the switches 206 and 208 alternately according to the feedback signal 220. For example, when the switch 206 is turned on by the PWM signal 210, the switch 208 is turned off by the PWM signal 212. The current $I_{230}$ can increase. Meanwhile, the second switch 226 is turned on by the PWM signal 210. The second current $I_{226}$ is proportional to the current $I_{230}$. When the switch 206 is turned off, the switch 208 is turned on. The current $I_{230}$ can decrease. Meanwhile, the second switch 226 is turned off. The second current $I_{226}$ is substantially equal to zero. The controller 202 can control, e.g., switch on/off, the switches 206 and 208 according to the feedback signal 220. In one embodiment, the current $I_{230}$ is used to charge a battery pack coupled to a terminal 216. In another embodiment, the current $I_{230}$ is used to power a load coupled to the terminal 216.

Figure 1:
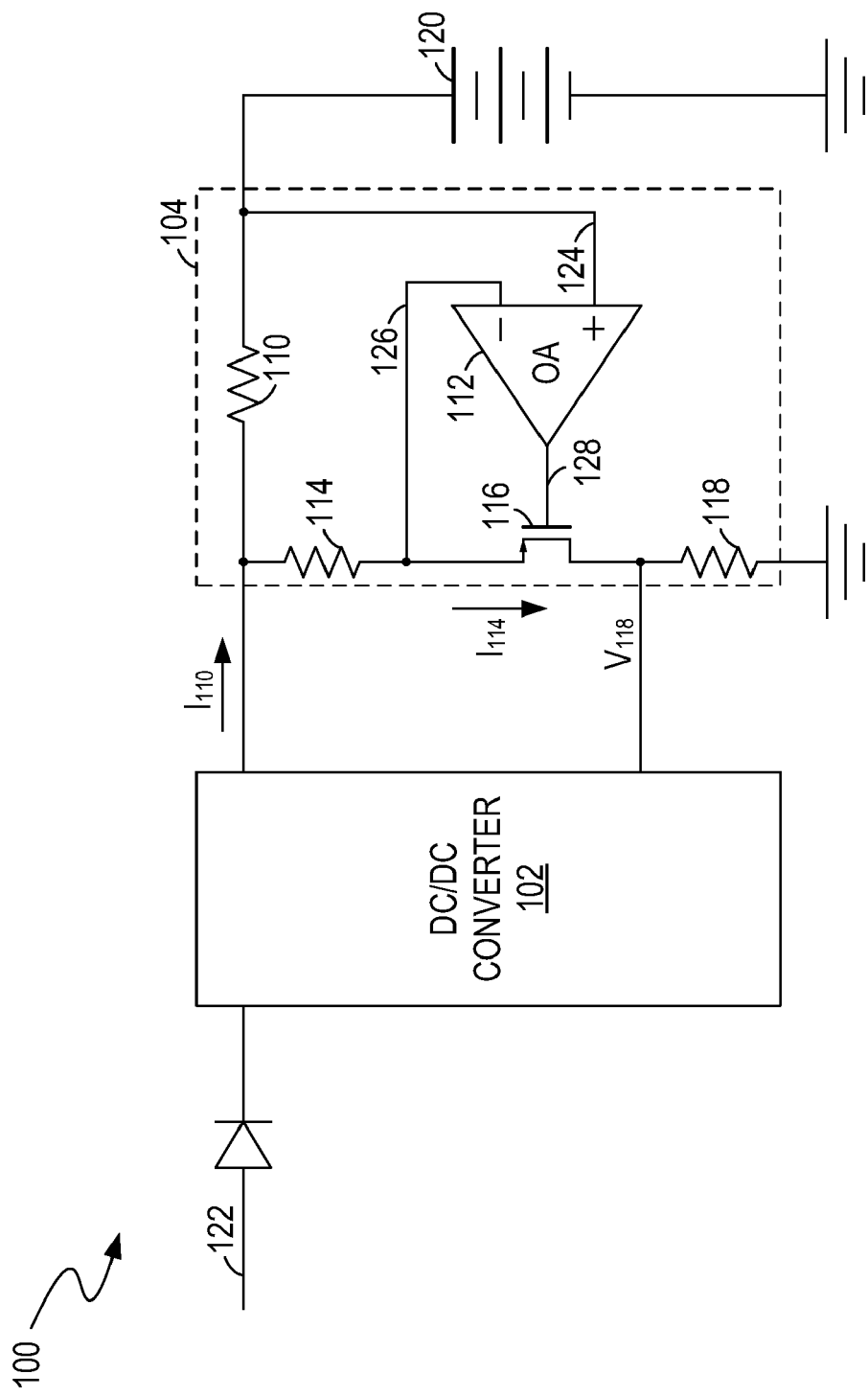
FIG. 1 illustrates a current control system, in accordance with the prior art.

Advantageously, in one embodiment, the sense resistor 110 and the operational amplifier 112 shown in FIG. 1 can be omitted, so as to reduce the cost and the power consumption. In addition, the second current $I_{226}$ can be relatively small, e.g., $I_{226}=I_{206}/1000$. Therefore, the power consumption can be further reduced.

Figure 2B:
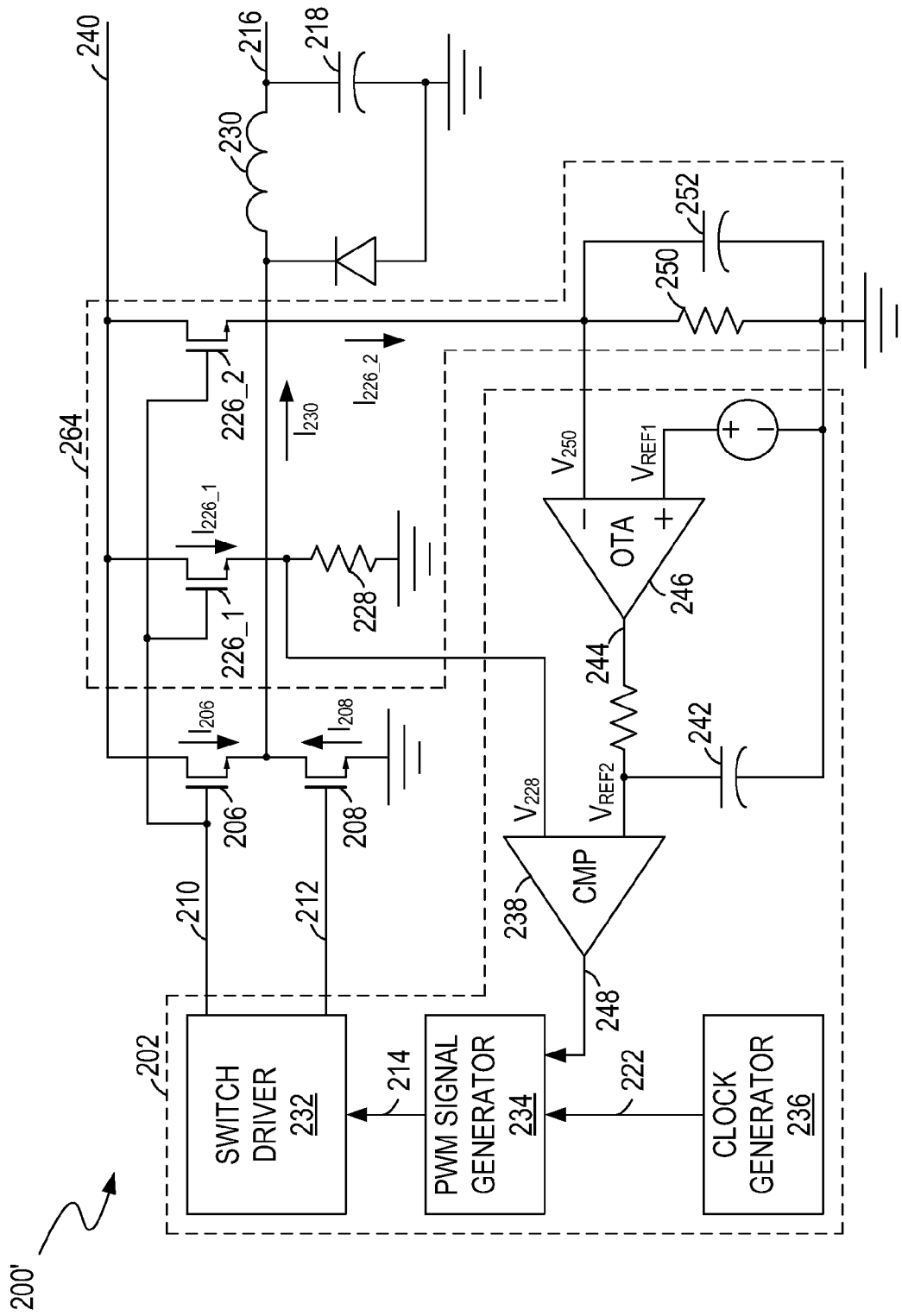
FIG. 2B illustrates a detailed circuit diagram example of a current control system, in accordance with one embodiment of the present invention.

FIG. 2B illustrates a detailed circuit diagram example of a current control system 200', in accordance with one embodiment of the present invention. Elements that are labeled the same as in FIG. 2A have similar functions. In the example of FIG. 2B, a current sensor 264 includes a second switch 226_1 and a third switch 226_2. Both of the switches 226_1 and 226_2 are coupled in parallel with the first switch 206. The second switch 226_1 provides a feedback current $I_{226\_1}$ flowing to ground via a resistor 228. The third switch 226_2 provides a feedback current $I_{226\_2}$ flowing to ground via the parallel-coupled resistor 250 and capacitor 252. When the switch 206 is turned on and the switch 208 is turned off, the second switch 226_1 and the third switch 226_2 can be turned on, such that both of the feedback currents $I_{226\_1}$ and $I_{226\_2}$ can be proportional to the current $I_{230}$ flowing through the inductor 230. When the switch 206 is turned off and the switch 208 is turned on, the switches 226_1 and 226_2 can be turned off, such that both of the feedback currents $I_{226\_1}$ and $I_{226\_2}$ can be substantially equal to zero.

As shown in FIG. 2B, the feedback current $I_{226\_2}$ flowing through the third switch 226_2 includes an AC (alternating current) portion $I_{252}$ flowing through the capacitor 252 and a substantial DC (direct current) portion $I_{250}$ flowing through the resistor 250. Since a level of the DC portion $I_{250}$ can be equal to an equivalent (average) level $I_{EQ226\_2}$ of the feedback current $I_{226\_2}$, a feedback voltage $V_{250}$ on the resistor 250 can be given by $V_{250}=I_{250}*R_{250}=I_{EQ226\_2}*R_{250}$, where $R_{250}$ represents resistance of the resistor 250. Since the equivalent level $I_{EQ226\_2}$ of the feedback current $I_{226\_2}$ can be proportional to the equivalent level $I_{EQ206}$ of the first current $I_{206}$, the feedback voltage level $V_{250}$ can be proportional to the equivalent level $I_{EQ206}$ of the first current $I_{206}$.

In one embodiment, the controller 202 includes an OTA (operational transconductance amplifier) 246 coupled to the third switch 226_2. The OTA 246 can receive a predetermined level $V_{REF1}$ and the voltage level $V_{250}$, and generate an output current 244 according to a difference between the predetermined level $V_{REF1}$ and the voltage level $V_{250}$. The output current 244 of the OTA 246 can be proportional to the difference between the voltage levels $V_{REF1}$ and $V_{250}$.

In one embodiment, the output current 244 can flow into or out from a capacitor 242 that is coupled between an output terminal of the OTA 246 and ground. More specifically, when the level $V_{250}$ is lower than the level $V_{REF1}$, the output current 244 can flow into the capacitor 242 so as to charge the capacitor 242, and a reference voltage $V_{REF2}$ on the capacitor 242 can increase. When the level $V_{250}$ is higher than the level $V_{REF1}$, the output current 244 can flow out from the capacitor 242, so as to discharge the capacitor 242, and the reference voltage $V_{REF2}$ can decrease. When the level $V_{250}$ is equal to the level $V_{REF1}$, the output current 244 can be zero and the reference voltage $V_{REF2}$ can be maintained at a specific level $V_{SP}$. In one embodiment, the specific level $V_{SP}$ can be determined by the reference level $V_{REF1}$. For example, the specific level $V_{SP}$ can increase as the reference level $V_{REF1}$ increases, and decrease as the reference level $V_{REF1}$ decreases. As a result, the OTA 246 can generate a reference signal, e.g., the reference voltage $V_{REF2}$ on the capacitor 242, according to a difference between a predetermined level, e.g., $V_{REF1}/R_{250}$, and a feedback signal, e.g., $I_{250}$, indicative of the first current $I_{206}$.

As mentioned above, the feedback current $I_{226\_1}$ can flow through the resistor 228, such that a feedback voltage $V_{228}$ on the resistor 228 can be given by $V_{228}=I_{226\_1}*R_{228}$, where $R_{228}$ represents resistance of the resistor 228. The feedback voltage $V_{228}$ can be proportional to the first current $I_{206}$. In one embodiment, the controller 202 further includes a comparator 238. The comparator 238 can compare the feedback signal $I_{226\_1}$ with a reference signal and generate a control signal 248 to control the first switch 206 according to the comparison. For example, the comparator 238 compares the feedback voltage $V_{228}$ with the reference voltage $V_{REF2}$.

More specifically, the control signal 248 controls a PWM signal generator 234 to generate a PWM signal 214, in one embodiment. In addition, the PWM signal generator 234 can be controlled by a clock signal 222 from a clock generator 236. A switch driver 232 can receive the PWM signal 214 and generate a pair of complementary PWM signals 210 and 212 to control the switches 206 and 208, respectively. By the applications of the comparator 238 and the clock generator 236, the controller 202 can turn on the switches 206 and 208 in an alternate fashion so as to adjust the current $I_{230}$. The current $I_{230}$ can have a saw-tooth waveform as shown in block 302 of FIG. 3. In addition, the reference level $V_{REF2}$ can be determined by the difference between the feedback voltage level $V_{250}$ and the reference level $V_{REF1}$. As a result, the current $I_{230}$ can be adjusted according to the reference level $V_{REF1}$ and the feedback voltage levels $V_{250}$ and $V_{228}$.

For example, when the control signal 248 is logic high and the clock signal 222 is logic low, the PWM signal 214 can be logic low. Thus, the PWM signal 210 can be logic low to turn off the switch 206, and the PWM signal 212 can be logic high to turn on the switch 208. As such, the current $I_{230}$ can decrease. When the control signal 248 is logic high and the clock signal 222 is logic low, the PWM signal 214 can be logic high. Thus, the PWM signal 210 can be logic high to turn on the switch 206 and the PWM signal 212 can be logic low to turn off the switch 208. As such, the current $I_{230}$ can increase. When both of the control signal 248 and clock signal 222 are logic low, a status of the PWM signal 214 remains unchanged, and so do the statuses of the switches 206 and 208. In one embodiment, the clock signal 222 has a predetermined clock cycle $T_{222}$ and a predetermined duty cycle $D_{248}$. The clock cycle $T_{222}$ and the duty cycle $D_{248}$ can be properly set, such that the control signal 248 and the clock signal 222 are not logic high simultaneously, in one embodiment.

By way of example, at the beginning of a clock cycle $T_{222}$ of the clock signal 222, the clock signal 222 can be logic high and the control signal 248 can be logic low, such that the current $I_{230}$ and the feedback voltage $V_{228}$ increase. After a time interval, the clock signal 222 can become logic low. During the period when both of the signals 248 and 222 are logic low, the feedback voltage $V_{228}$ can increase. In one embodiment, the clock cycle $T_{222}$ of the clock signal 222 can be properly set, such that the feedback voltage level $V_{228}$ can increase to the reference level $V_{REF2}$ before one clock cycle $T_{222}$ expires. When the feedback voltage $V_{228}$ reaches to the reference level $V_{REF}2$, the control signal 248 can become logic high, therefore the current $I_{230}$ can decrease. Meanwhile, the second switch 226_1 is turned off, therefore the feedback voltage $V_{228}$ can be zero. As such, the control signal 248 can become logic low again. During the period when both of the signals 248 and 222 are logic low, the current $I_{230}$ can decrease. The clock cycle $T_{222}$ can also be properly set, such that the current $I_{230}$ will not decrease to zero before one clock cycle $T_{222}$ expires. When the clock cycle $T_{222}$ expires, the clock signal 222 can become logic high again, such that the current $I_{230}$ can increase.

In one embodiment, at the beginning of the operation, both of the currents $I_{230}$ and $I_{206}$ can be zero. Therefore, the level of the feedback voltage $V_{250}$ can be zero and lower than the reference level $V_{REF1}$. As such, the OTA 246 can generate the output current 244 to charge the capacitor 242, so as to increase the reference voltage $V_{REF2}$. By comparing the feedback voltage level $V_{228}$ with the reference level $V_{REF2}$, the controller 202 can adjust the maximum level of the feedback voltage $V_{228}$ to increase as the reference level $V_{REF2}$ increases. As such, the equivalent level $I_{EQ230}$ of the current $I_{230}$ increases as the reference level $V_{REF2}$ increases, so does the equivalent level $I_{250}$ of the current $I_{226\_2}$. When the equivalent level $I_{250}$ increases to a current level $V_{REF1}/R_{250}$, e.g., the feedback voltage $V_{250}$ increases to the reference level $V_{REF1}$, the output current 244 can be zero and the reference level $V_{REF2}$ can be maintained at a specific level $V_{SP}$. In addition, if the feedback voltage level $V_{250}$ is higher than the reference level $V_{REF1}$, the output current 244 can flow out from the capacitor 242, so as to decrease the reference level $V_{REF2}$. Thus, the feedback voltage level $V_{250}$ can decrease. Consequently, the equivalent level $I_{250}$ can be maintained at $V_{REF1}/R_{250}$, and the equivalent level $I_{EQ230}$ can be maintained at a current level $I_{CT}$, e.g., as shown in block 302 of FIG. 3.

Advantageously, in one embodiment, the reference level $V_{REF1}$ is controllable and the current level $I_{CT}$ is proportional to the reference level $V_{REF1}$. As a result, the equivalent level $I_{EQ230}$ of the current $I_{230}$ can be adjusted to a desirable level by controlling the reference level $V_{REF1}$. Moreover, the output current 244 of the OTA 246 can be zero when the current control system 200' enters the normal operation, e.g., when the feedback voltage $V_{250}$ is equal to the reference level $V_{REF1}$, such that the power consumption of the current control system 200' can be further reduced.

In the examples of FIG. 2A and FIG. 2B, the current control systems 200 and 200' can adjust the current $I_{230}$ according to the feedback signal indicative of the first current $I_{206}$ flowing through the high-side switch 206. In another embodiment, the current control systems 200 and 200' can also, in a similar manner, adjust the current $I_{230}$ according to a feedback signal (not shown in FIG. 2A and FIG. 2B) indicative of a current $I_{208}$ flowing through the low-side switch 208. In one such embodiment, a separate current sensor (not shown in FIG. 2A and FIG. 2B) having the similar function and/or structure of the current sensor 264 can be used to generate the feedback signal indicative of the current $I_{208}$.

Figure 3:
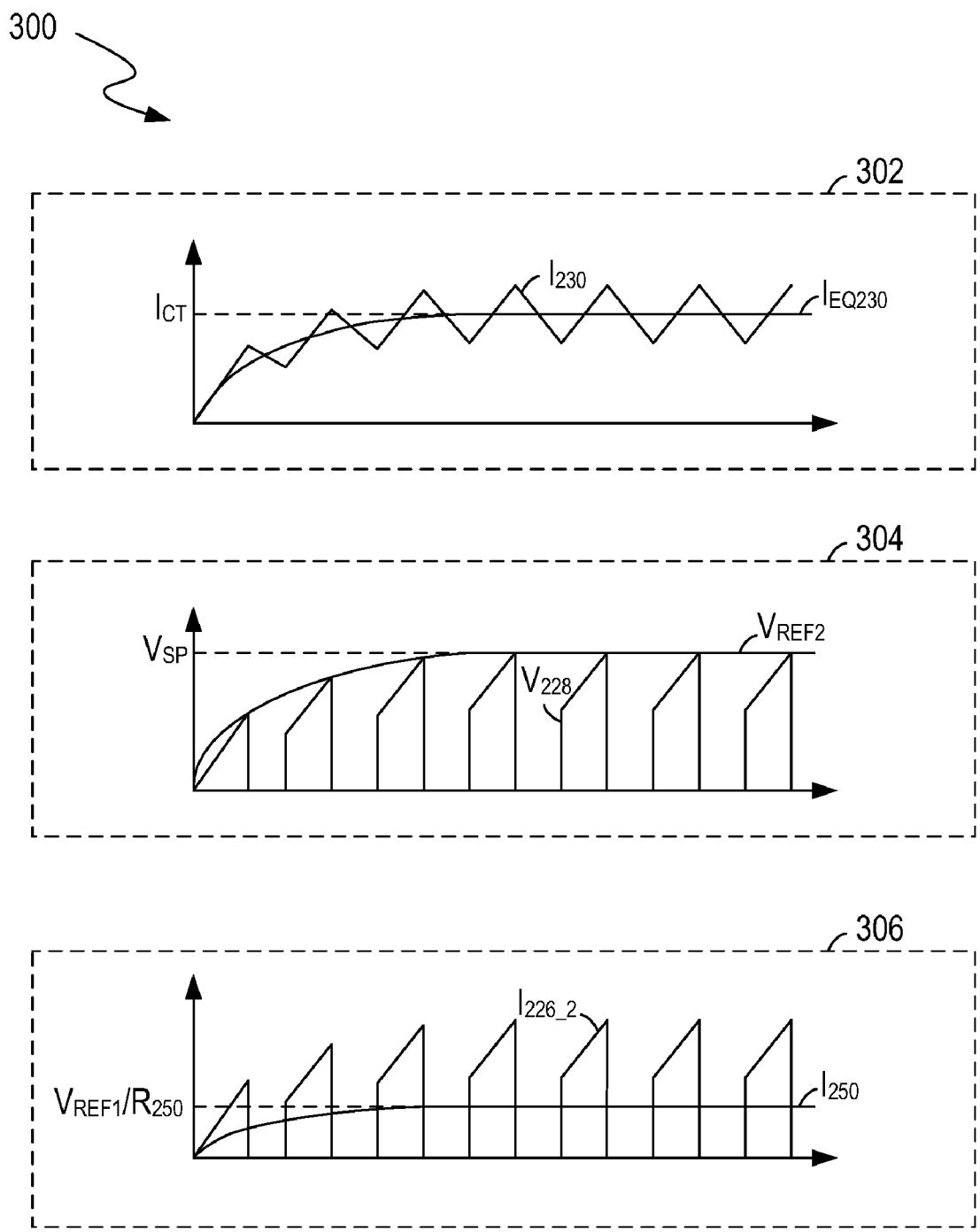
FIG. 3 illustrates plot examples of the adjusted current and the feedback signals in FIG. 2A and FIG. 2B, in accordance with one embodiment of the present invention.

FIG. 3 illustrates plot examples of the adjusted current $I_{230}$ and the feedback signals, e.g., $I_{226\_1}$, $V_{228}$, $I_{226\_2}$, $V_{250}$, in accordance with one embodiment of the present invention. FIG. 3 is described in combination with FIG. 2A and FIG. 2B.

Since the controller 202 can turn on the switches 206 and 208 alternately so as to adjust the current $I_{230}$, the waveform of the current $I_{230}$ can be a saw-tooth waveform as shown in block 302. As mentioned in relation to FIG. 2B, when the switch 206 is turned on and the switch 208 is turned off, both of the feedback currents $I_{226\_1}$ and $I_{226\_2}$ can be proportional to the current $I_{230}$. When the switch 206 is turned off and the switch 208 is turned on, both of the feedback currents $I_{226\_1}$ and $I_{226\_2}$ can be substantially equal to zero. Thus, as shown in block 304, the feedback voltage $V_{228}$ can vary in accordance with the current $I_{230}$ when the switch 206 is on and the switch 208 is off. In addition, as shown in block 306, the feedback current $I_{226\_2}$ also can vary in accordance with the current $I_{230}$ when the switch 206 is on and the switch 208 is off.

As shown in blocks 304 and 306, when the equivalent level $I_{250}$ Of the current $I_{226\_2}$ is less than the level $V_{REF1}/R_{250}$, the reference level $V_{REF2}$ can increase. When equivalent level $I_{250}$ of the current $I_{226\_2}$ increases to the level $V_{REF1}/R_{250}$, the reference level $V_{REF2}$ can be maintained at the specific level $V_{SP}$. In addition, the maximum level of the feedback voltage $V_{228}$ can increase as the reference level $V_{REF2}$ increase. Consequently, the equivalent level $I_{EQ230}$ of the current $I_{230}$ can increase as the reference level $V_{REF2}$ increases.

As shown in blocks 302 and 306, the equivalent level $I_{EQ230}$ of the current $I_{230}$ can be proportional to the equivalent level $I_{250}$ of the current $I_{226\_2}$. When the equivalent level $I_{250}$ of the current $I_{226\_2}$ is adjusted to the level $V_{REF1}/R_{250}$, the equivalent level $I_{EQ230}$ of the current $I_{230}$ can be equal to the current level $I_{CT}$.

FIG. 4 illustrates a flowchart example 400 of operations performed by the current control system 200/200', in accordance with one embodiment of the present invention. FIG. 4 is described in combination with FIG. 2A and FIG. 2B.

In block 402, the first switch 206 can be used to deliver the first current $I_{206}$. In block 404, the second switch 226 coupled in parallel with the first switch 206 can provide the feedback signal 220, e.g., the second current $I_{220}$, indicative of the first current $I_{206}$. Similarly, the second switch 226_1 can provide the feedback current $I_{226\_1}$ and the feedback voltage $V_{228}$. The third switch 226_2 can provide the feedback current $I_{226\_2}$ and the feedback voltage $V_{250}$.

In block 406, the controller 202 can adjust the first current $I_{206}$ according to the feedback signal. More specifically, in one embodiment, the OTA 246 receives the predetermined level $V_{REF1}$ and the feedback voltage level $V_{250}$, and generates the output current 244 according to a difference between the levels $V_{REF1}$ and $V_{250}$. The output current 244 can be used to increase/decrease the reference voltage $V_{REF2}$ on the capacitor 242. The comparator 238 can compare the feedback voltage $V_{228}$ with the reference voltage $V_{REF2}$, and control the first switch 206 according to the comparison, so as to adjust the first current $I_{206}$.

Figure 5:
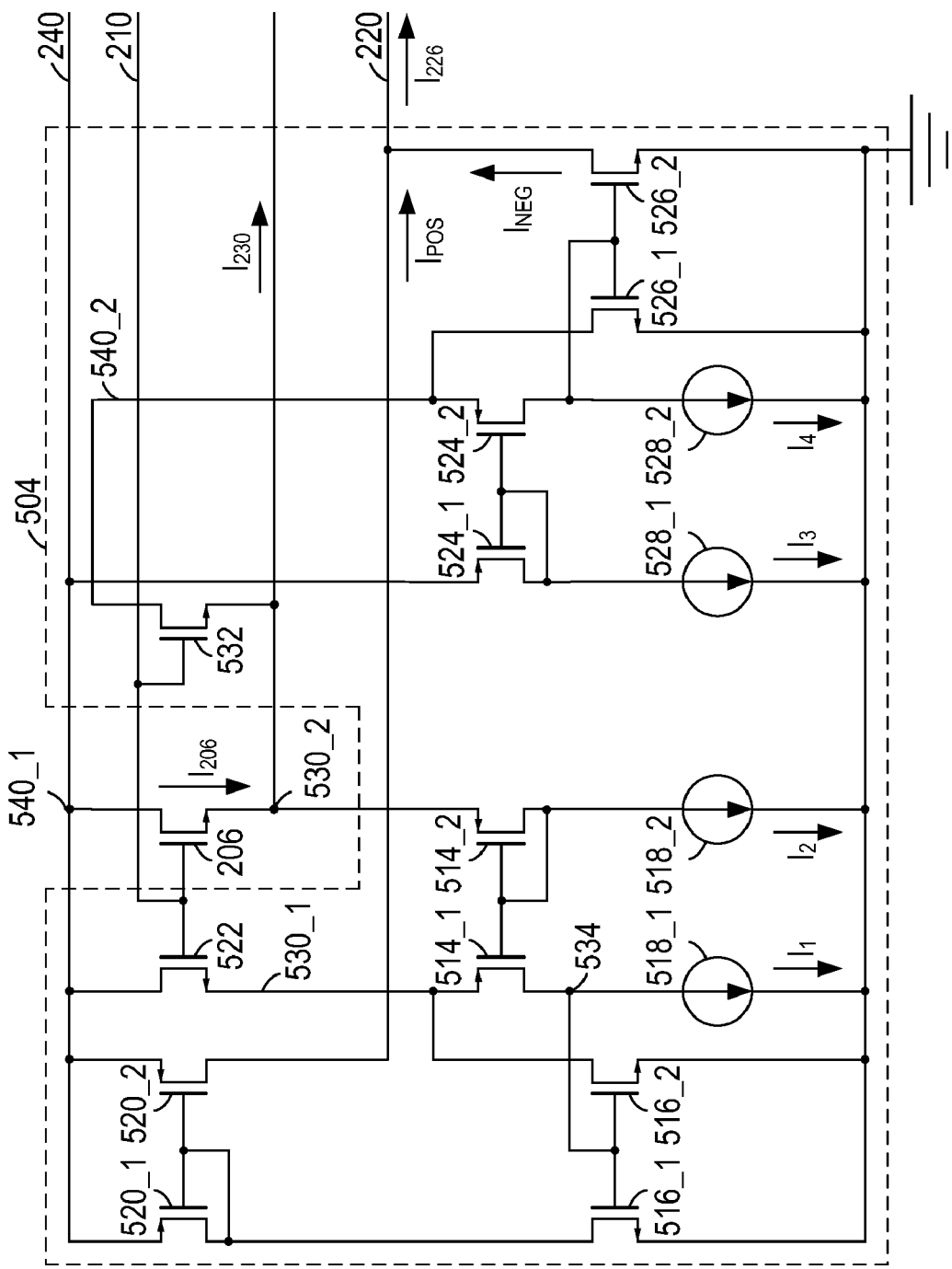
FIG. 5 illustrates a detailed circuit diagram example of a current sensor coupled to a switch, in accordance with one embodiment of the present invention.

FIG. 5 illustrates a detailed circuit diagram example of a current sensor 504 coupled to the first switch 206, in accordance with one embodiment of the present invention. Elements that are labeled the same as in FIG. 2A and FIG. 2B have similar functions. FIG. 5 is described in combination with FIG. 2A and FIG. 2B.

As shown in FIG. 5, the first switch 206 coupled to the power supply terminal 240 can adjust the current $I_{206}$ according to a first sense signal and a second sense signal. The current sensor 504 coupled to the first switch 206 can be used to sense the current $I_{206}$. In one embodiment, the current sensor 504 includes a second switch 522 and a third switch 532. The second switch 522 can be, but is not limited to, a MOSFET. The third switch 532 can be, but is not limited to, a MOSFET.

In one embodiment, the second switch 522 is coupled to a first terminal, e.g., a gate terminal, of the first switch 206 and a second terminal 540_1, e.g., a drain terminal, of the first switch 206. The second switch 522 can be used to provide the first sense signal, e.g., a first sense current $I_{522}$ flowing through the second switch 522. In one such embodiment, the first sense signal e.g., the first sense current $I_{522}$, indicates the current $I_{206}$ when the current $I_{206}$ flows in a first direction, e.g., from terminal 540_1 to terminal 530_2. Similarly, the third switch 532 can be coupled to the first terminal, e.g., the gate terminal, of the first switch 206 and a third terminal 530_2, e.g., a source terminal, of the first switch 206. The third switch 532 can be used to provide the second sense signal, e.g., a second sense current $I_{532}$ flowing through the third switch 532. The second sense signal, e.g., the second sense current $I_{532}$, indicates the current $I_{206}$ when the current $I_{206}$ flows in a second direction, e.g., from terminal 530_2 to terminal 540_1.

More specifically, in one embodiment, the switch 206 operates in the linear (Ohmic) region. As such, when a voltage level $V_{530\_2}$ at the terminal 530_2 is lower than a voltage level $V_{540\_1}$ at the terminal 540_1, the current $I_{206}$ can flow from the terminal 540_1 to the terminal 530_2. When the voltage level $V_{530\_2}$ is higher than the voltage level $V_{540\_1}$, the current $I_{206}$ can flow from the terminal 530_2 to the terminal 540_1. Assume that a level of the current $I_{206}$ is positive when the current $I_{206}$ flows from the terminal 540_1 to the terminal 530_2, and is negative when the current $I_{206}$ flows from the terminal 530_2 to the terminal 540_1. In one embodiment, when the current level $I_{206}$ is positive, the first sense current $I_{522}$ flowing through the second switch 522 is proportional to the current $I_{206}$, and at the meantime the second sense current $I_{532}$ flowing through the third switch 532 is substantially zero. In one embodiment, when the current level $I_{206}$ is negative, the second sense current $I_{532}$ flowing through the third switch 532 is proportional to the current $I_{206}$, and at the meantime the first sense current $I_{522}$ flowing through the second switch 522 is substantially zero. As used herein, "substantially zero" means that the current may be different from zero so long as a leakage current that may flow through the switch 532 or switch 522 is relatively small and can be omitted.

As shown in FIG. 5, the current sensor 504 can also include two current sources 518_1 and 518_2 for providing two substantially identical currents $I_1$ and $I_2$ respectively. As used herein, "substantially identical" means that a difference between the current $I_1$ and the current $I_2$ is permissible so long as the difference is relatively small and can be omitted. A current mirror that includes identical MOSFETs 514_1 and 514_2 can be coupled between the two current sources 518_1 and 518_2. The substantially identical currents $I_1$ and $I_2$ can flow through the MOSFETs 514_1 and 514_2 respectively, such that a voltage level at the source terminal of the MOSFET 514_1 and a voltage level at the source terminal of the MOSFET 514_2 can be substantially the same.

In one embodiment, the current mirror is also coupled between the third terminal 530_2 of the first switch 206 and the terminal 530_1 of the second switch 522. Thus, the current mirror can adjust a voltage level at the terminal 530_2 of the first switch 206 and a voltage level at the terminal 530_1 of the second switch 522 to be substantially the same. As such, in one embodiment, the first and second switches 206 and 522 have substantially the same gate voltage, drain voltage, and source voltage. Thus, the first sense current $I_{522}$ flowing through the second switch 522 can be proportional to the current $I_{206}$. In addition, if W/L is a width-to-length ratio of the first switch 206, and $W_2/L_2$ is a width-to-length ratio of the second switch 522, the ratio of the current $I_{206}$ to the current $I_{522}$ can be equal to the ratio of W/L to $W_2/L_2$, e.g., $I_{206}/I_{522}=(W/L)/(W_2/L_2)$.

Compared with the first sense current $I_{522}$, the current $I_1$ can be neglected, such that a sense current $I_{516\_2}$ flowing through a MOSFET 516_2 that is coupled to the terminal 530_1 can be substantially equal to the first sense current $I_{522}$. In one embodiment, the current sensor 504 further includes a current mirror that includes identical MOSFETs 516_1 and 516_2, and a current mirror that includes identical MOSFETs 520_1 and 520_2. By the applications of the MOSFETs 516_1, 516_2, 520_1 and 520_2, a sense current $I_{516\_1}$ flowing through the MOSFET 516_1 can be equal to the sense current $I_{516\_2}$, and a sense current $I_{POS}$ flowing through the MOSFET 520_2 can be equal to the sense current $I_{516\_1}$. As a result, the sense current $I_{POS}$ can be substantially equal to the first sense current $I_{522}$, and therefore can be proportional to the current $I_{206}$, e.g., $I_{206}/I_{POS}=(W/L)/(W_2/L_2)$.

In one embodiment, when the current $I_{206}$ flows in the first direction that is from the terminal 540_1 to the terminal 530_2, the first sense current $I_{522}$ and the sense current $I_{POS}$ is proportional to the current $I_{206}$. However, when the current $I_{206}$ flows from the terminal 530_2 to the terminal 540_1, the voltage level $V_{530\_2}$ at the terminal 530_2 is higher than a voltage level $V_{240}$ at the power supply terminal 240. If the current source 518_1 operates properly, a voltage level $V_{530\_1}$ at the terminal 530_1 can be equal to the voltage level $V_{530\_2}$. Therefore, the voltage level $V_{530\_1}$ is higher than the power supply voltage level $V_{240}$. As such, the first sense current $I_{522}$ will not flow through the switch 522 from the power supply terminal 240 to the terminal 530_1. Moreover, since the voltage level $V_{530\_1}$ is higher than ground, the sense current $I_{516\_2}$ will not flow through the switch 516_2 from ground to the terminal 530_1. As a result, the current $I_1$ provided by the current source 518_1 can become zero, and a voltage level at a terminal 534 of the current source 518_1 can be dragged down. In one embodiment, the gate terminals of the MOSFETs 516_1 and 516_2 are coupled to the terminal 534. Therefore, the MOSFETs 516_1 and 516_2 can be turned off. In other words, when the current $I_{206}$ flows in the second direction that is from the terminal 530_2 to the terminal 540_1, the first sense current $I_{522}$ and the sense current $I_{POS}$ can be substantially zero. As used herein, "substantially zero" means that the sense current $I_{POS}$ may be different from zero so long as a leakage current that may flow through the switch 520_2 is relatively small and can be omitted.

Similarly, current sources 528_1 and 528_2 can generate two substantially identical currents $I_3$ and $I_4$ to flow through a current mirror, e.g., to flow through identical MOSFETs 524_1 and 524_2 respectively. As such, a voltage level at the source terminal of the MOSFET 524_1 and a voltage level at the source terminal of the MOSFET 524_2 can be substantially the same. In one embodiment, the source terminal of the MOSFET 524_1 is coupled to the second terminal 540_1 of the first switch 206, and the source terminal of the MOSFET 524_2 is coupled to the terminal 540_2 of the third switch 532. As such, a voltage level at the second terminal 540_1 of the first switch 206 and a voltage level at the terminal 540_2 of the third switch 532 can be substantially the same. In other words, the first and third switches 206 and 532 can have substantially the same gate voltage, drain voltage, and source voltage. Thus, the second sense current $I_{532}$ flowing through the third switch 532 can be proportional to the current $I_{206}$.

Compared with the second sense current $I_{532}$, the current $I_4$ can be neglected. Therefore, a sense current $I_{526\_1}$ flowing a switch 526_1 that is coupled to the terminal 540_2 can be substantially equal to the second sense current $I_{532}$. By the application of a current mirror that includes the identical MOSFETs 526_1 and 526_2, a sense current $I_{NEG}$ flowing through the MOSFET 526_2 can be substantially equal to the second sense current $I_{532}$. Furthermore, in one embodiment, the second and third switches 522 and 532 can have the same width-to-length ratio, such that the ratio of the current $I_{206}$ to the current $I_{532}$ can be equal to the ratio of W/L to $W_2/L_2$, e.g., $I_{206}/I_{532}=(W/L)/(W_2/L_2)$.

In one embodiment, when the current $I_{206}$ flows in the second direction that is from the terminal 530_2 to the terminal 540_1, the second sense current $I_{532}$ and the sense current $I_{NEG}$ can be proportional to the current $I_{206}$, e.g., $I_{206}/I_{NEG}=(W/L)/(W_2/L_2)$. When the current $I_{206}$ flows from the terminal 540_1 to the terminal 530_2, the current $I_4$ can become zero and the MOSFETs 526_1 and 526_2 can be turned off. Thus, the second sense current $I_{532}$ and the sense current $I_{NEG}$ can be substantially zero.

Advantageously, the feedback signal 220, e.g., the second current $I_{226}$, generated by the current sensor 504 can be a superposition of the sense current $I_{POS}$ and the sense current $I_{NEG}$, e.g., $I_{226}=I_{POS}+I_{NEG}=I_{206}*(W/L)/(W_2/L_2)$. As such, the current sensor 504 can sense not only the positive portion of the current $I_{206}$ but also the negative portion of the current $I_{206}$. In one embodiment, the controller 202 can adjust the $I_{206}$ according to the sense signals $I_{POS}$ and $I_{NEG}$, so as to adjust the current $I_{230}$. In the example of FIG. 5, the current sensor 504 is used to sense the current $I_{206}$ flowing through the switch 206. However, the current sensor 504 can also be used to sense currents flowing through other switches, such as the switch 208, a charging switch and a discharging switch in a battery charging/discharging system, etc.

Accordingly, embodiments in accordance with the present invention provide current control systems that generate regulated currents. The current control systems can be used in various applications, e.g., charging a battery pack, powering a load, or driving LEDs (light emit diodes), etc. By employing the current mirrors, the current control systems can generate feedback signals having relatively low levels indicating the currents. In addition, the current control systems can adjust the currents according to the feedback signals, e.g., by comparing the feedback signals with reference signals. As such, the current control systems can adjust the currents to predetermined or desirable levels. Furthermore, the cost and the power consumption of the current control systems can be reduced.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A current control system comprising:
   a first switch;
   a second switch coupled in parallel with said first switch and operable for providing a feedback signal indicative of a first current flowing through said first switch, wherein said feedback signal is determined by a width-to-length ratio of said first switch and a width-to-length ratio of said second switch;
   a third switch coupled in parallel with said first switch and operable for providing a feedback current indicative of said first current flowing through said first switch;
   an amplifier coupled to said third switch and operable for generating a reference signal according to a difference between a predetermined level and a level of said feedback current; and
   a controller coupled to said first and second switches, and operable for adjusting said first current according to said feedback signal and said reference signal.

2. The current control system as claimed in claim 1, wherein a voltage level at a terminal of said first switch and a voltage level at a terminal of said second switch are substantially the same.

3. The current control system as claimed in claim 1, wherein said feedback signal comprises a second current flowing through said second switch that is proportional to said first current.

4. The current control system as claimed in claim 1, wherein said controller controls said first current by alternately turning on said first switch and a driven switch coupled in series to said first switch according to said feedback signal.

5. The current control system as claimed in claim 1, wherein said controller comprises a comparator operable for comparing said feedback signal with said reference signal, and for generating a control signal to control said first switch according to the comparison.

6. The current control system as claimed in claim 1, wherein said reference signal comprises a voltage on a capacitor that is coupled between an output terminal of said amplifier and ground.

7. The current control system as claimed in claim 1, wherein said controller comprise a pulse signal generator operable for generating a pulse width modulation (PWM) signal to control said first switch and adjusting a duty cycle of said PWM signal according to said feedback signal.

8. A method for controlling a first current comprising:
delivering said first current by a first switch;
providing a feedback signal indicative of said first current by a second switch coupled in parallel with said first switch;
providing a feedback current indicative of said first current by a third switch coupled in parallel with said first switch;
generating a reference signal according to a difference between a predetermined level and a level of said feedback current; and
adjusting said first current according to said feedback signal and said reference signal,
wherein a voltage level at a terminal of said first switch and a voltage level at a terminal of said second switch are substantially the same.

9. The method as claimed in claim 8, wherein said feedback signal comprises a second current flowing through said second switch that is proportional to said first current.

10. The method as claimed in claim 8, further comprising:
controlling said first current by alternately turning on said first switch and a driven switch coupled in series to said first switch according to said feedback signal.

11. The method as claimed in claim 8, further comprising:
comparing said feedback signal with said reference signal; and
controlling said first switch according to the comparison.

12. A current control system comprising:
a control terminal operable for providing a control signal to control a first switch, a second switch, and a third switch; and
control circuitry coupled to said control terminal and operable for generating said control signal, controlling said second switch to provide a feedback signal indicative of a first current flowing through said first switch, controlling said third switch to provide a feedback current indicative of said first current, generating a reference signal according to a difference between a predetermined level and a level of said feedback current, and adjusting said first current according to said feedback signal and said reference signal, wherein said feedback signal is determined by a width-to-length ratio of said first switch and a width-to-length ratio of said second switch.

13. The current control system as claimed in claim 12, wherein a voltage level at a terminal of said first switch and a voltage level at a terminal of said second switch are substantially the same.

14. The current control system as claimed in claim 12, wherein said feedback signal comprises a second current flowing through said second switch that is proportional to said first current.

15. The current control system as claimed in claim 12, wherein said control circuitry controls said first current by alternately turning on said first switch and a driven switch coupled in series to said first switch according to said feedback signal.

16. The current control system as claimed in claim 12, wherein said control circuitry generates a control signal by comparing said feedback signal with said reference signal.

17. The current control system as claimed in claim 12, wherein said reference signal comprises a voltage on a capacitor that is coupled between an output terminal of said amplifier and ground.

18. The current control system as claimed in claim 12, wherein said control signal comprises a pulse width modulation (PWM) signal, and wherein said control circuitry adjusts a duty cycle of said PWM signal according to said feedback signal.

19. The current control system as claimed in claim 1, wherein said reference signal is maintained at a specific level when said level of said feedback current is substantially equal to said predetermined level.

20. The method as claimed in claim 8, wherein said reference signal is maintained at a specific level when said level of said feedback current is substantially equal to said predetermined level.

21. The current control system as claimed in claim 12, wherein said reference signal is maintained at a specific level when said level of said feedback current is substantially equal to said predetermined level.

* * * * *